United States Patent [19]
Hirahara

[11] Patent Number: 5,260,638
[45] Date of Patent: Nov. 9, 1993

[54] METHOD AND CIRCUIT FOR QUICK CHARGING OF SECONDARY CELL

[75] Inventor: Minoru Hirahara, Kawasaki, Japan

[73] Assignee: Fujitsu Limited, Japan

[21] Appl. No.: 964,427

[22] Filed: Oct. 21, 1992

[30] Foreign Application Priority Data

Oct. 25, 1991 [JP] Japan ............................... 3-278176

[51] Int. Cl.[5] .................. H02J 7/04; H01M 14/00; H01M 10/48
[52] U.S. Cl. .......................... 320/46; 320/2; 429/7; 429/90
[58] Field of Search ............... 320/46, 2; 429/90, 7

[56] References Cited

U.S. PATENT DOCUMENTS

| | | | |
|---|---|---|---|
| 3,584,285 | 6/1971 | Goodkin | 320/46 |
| 3,656,340 | 4/1972 | Ball | 429/90 |
| 3,781,751 | 12/1973 | Sulger, Sr. | 320/46 X |
| 4,689,544 | 8/1987 | Stadnick et al. | 320/46 |

Primary Examiner—R. J. Hickey
Attorney, Agent, or Firm—Welsh & Katz, Ltd.

[57] ABSTRACT

A quick charging method of secondary cell in which a secondary cell is prevented from being damaged on account of overcharging. A strain gage is bonded to the side face of a cell to be charged. A low resistor for quick charging and a high resistor for normal charging connected in parallel are inserted between a charger and the cell. The low resistor for quick charging is connected with the contact of a normally open contact relay. A voltage for measurement is generated according to the resistance of the strain gage and this voltage for measurement is compared with a reference voltage. The relay is ON/OFF controlled by the result of the comparison. Since the resistance of the strain gage is low in the beginning stage of charging, a high voltage for measurement is generated and, thereby, the relay is energized and the contact is closed so that quick charging is performed. When the cell is fully charged, the resistance of the strain gage increases and, thereby, the relay is turned OFF and the quick charging mode is switched to the normal charging mode.

6 Claims, 4 Drawing Sheets

METHOD AND CIRCUIT FOR QUICK CHARGING OF SECONDARY CELL

BACKGROUND OF THE INVENTION

1. Field of the Invention

The present invention relates to a method and a circuit for quick charging of a secondary cell, such as a nickel-cadmium cell.

2. Description of the Related Art

A secondary cell means a rechargeable cell and is distinguished from an unrechargeable primary cell such as a dry cell. Primary cells include such dry cells as manganese cells, alkaline cells, and mercury cells, which are on the market and widely used for transistor radios, cameras, tape recorders, watches, and so on.

On the other hand, secondary cells are frequently used for communications terminals such as cordless phones and portable phones, in which when the voltage of the cell drops, it can be recharged and used again and again without exchanging it with a new one. Of the secondary cells, those most extensively used are nickel-cadmium cells.

In charging methods of a secondary cell, there are two kinds, i.e., the standard charging method and the quick charging method. The standard charging method is such that charges a cell with a current approximately one tenth of the cell capacity and taking a time of about 15 hours. In this method, since the charging current is small, no problem arises even if the charging time goes, to a certain degree, over the standard time. In this method, however, since it takes more than half a day before the cell can be used again after it has lost its capacity, effective use of the apparatus cannot be attained.

In the quick charging method, the cell is charged with a current about 1.5 times as large as the cell capacity and taking a time of about one hour. Since this method finishes the charging in one hour or so, effective use of the apparatus can be attained. However, since the cell is charged with a current larger than the cell capacity, it sometimes occurs that the cell is overcharged if the point of completion of the charging is not accurately detected and that, in the worst case, the cell is damaged. More specifically, if the charging operation is continued even after the cell is fully charged, the electrolyte is gasified and the cell is exploded.

There have been in practice two quick charging methods of secondary cell. One is such that measures the rate of change, i.e., the gradient, of charging voltage to charging time and the other is such that measures change of the surface temperature of the cell with charging time.

The method that measures the rate of change of charging voltage to charging time will be described below with reference to FIG. 1A and FIG. 1B. Having a cell 2 connected with a battery charger 4 and a voltmeter 6 as shown in FIG. 1A, the cell 2 is quickly charged while the voltage of the cell 2 is being measured. Supposing that the cell voltage is 1.2 V and the cell capacity is 500 mAH, charging the cell 2 is completed in about one hour with a current of 500 mA passed through the cell. In this charging method, with the gradient $\Delta V$ of the charging voltage to the time measured, the charging must be stopped as soon as the charging voltage has reached the peak voltage and the gradient become $-\Delta V$ as shown in FIG. 1B.

Now, the method to measure the surface temperature of a cell to detect completion of charging will be described with reference to FIG. 2A and FIG. 2B. In this method, as shown in FIG. 2A, a temperature sensor 8 is attached to the conductive casing as the negative electrode of the cell 2. The charging is stopped immediately after the surface temperature of the cell 2 has reached a specified charge completion temperature $T_0$. If the charging is continued past the specified temperature $T_0$, there is a danger that the cell will be broken. Since the surface temperature of the cell 2 at the time of completion of charging can change according to the ambient temperature, the specified temperature $T_0$ must be adjusted according to the ambient temperature.

Whichever of the above described quick charging method is employed, charging is performed with a current larger than the cell capacity. Hence, unless the point of completion of charging is accurately detected, overcharging is caused, and this leads to such problems as occurrence of leakage of the electrolyte or gas, and if the overcharging is continued, the life of the cell is shortened or the capacity of it decreased.

SUMMARY OF THE INVENTION

Accordingly, an object of the present invention is to provide a quick charging method of secondary cell wherein the point of completion of charging is accurately detected and, thereupon, the quick charging is automatically stopped.

Another object of the present invention is to provide a quick charging circuit of secondary cell wherein the point of completion of charging is accurately detected and, thereupon, the quick charging is automatically stopped.

In accordance with an aspect of the present invention, there is provided a quick charging method of secondary cell comprising the steps of: bonding a strain gage to the inner surface of a casing of a cell to be charged; connecting in parallel a first resistor for quick charging and a second resistor for normal charging to the cell; connecting the cell to an AC commercial power supply through a battery charger; charging the cell through the first and second resistors when the resistance of the strain gage is lower than a specified value; and charging the cell only through the second resistor when the resistance becomes higher than the specified value.

Preferably, a voltage for measurement is generated according to the resistance of the strain gage, and the contact of a normally closed contact relay is connected in series with the first resistor, and the voltage for measurement is compared with a reference voltage and, when the voltage for measurement becomes lower than the reference voltage, the relay is energized so as to open the contact.

In accordance with another aspect of the present invention, there is provided a quick charging circuit of secondary cell comprising: a strain gage bonded to the inner surface of the casing of a cell to be charged; a rectifier circuit for converting alternating current to direct current; a first resistor for quick charging connected between the cell and the rectifier circuit; a second resistor for normal charging connected between the cell and the rectifier circuit and in parallel with the first resistor; switch means connected in series with the first resistor; means for generating a reference voltage; means for generating a voltage for measurement according to resistance of the strain gage; comparison means for comparing the voltage for measurement with the reference voltage; and means connected with the comparison means for closing the switch means when the voltage for measurement is higher than the reference voltage and opening the switch means when the voltage for measurement is lower than the reference voltage.

According to the present invention, the time when a cell is fully charged can be accurately detected and, thereupon, quick charging can be automatically switched to normal charging. Therefore, the cell is effectively prevented from being broken due to overcharging.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1A:
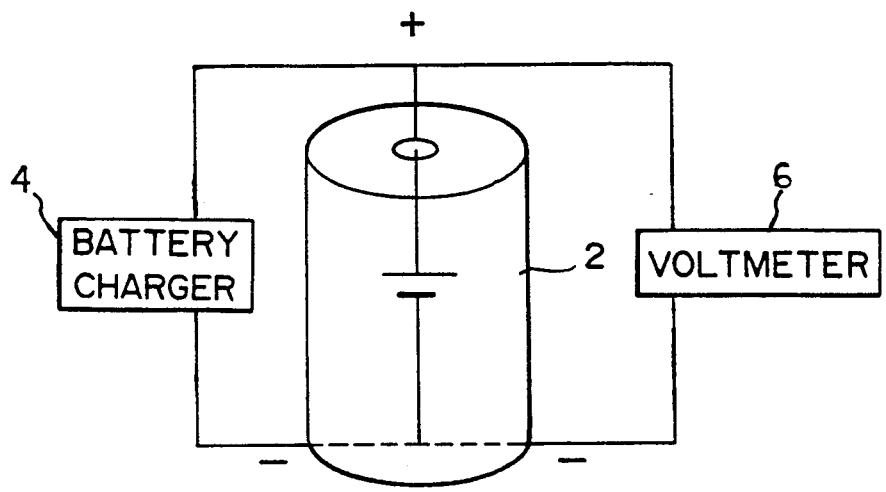
FIG. 1A is a schematic diagram showing a prior art example of a quick charging method of secondary cell.
Figure 1B:
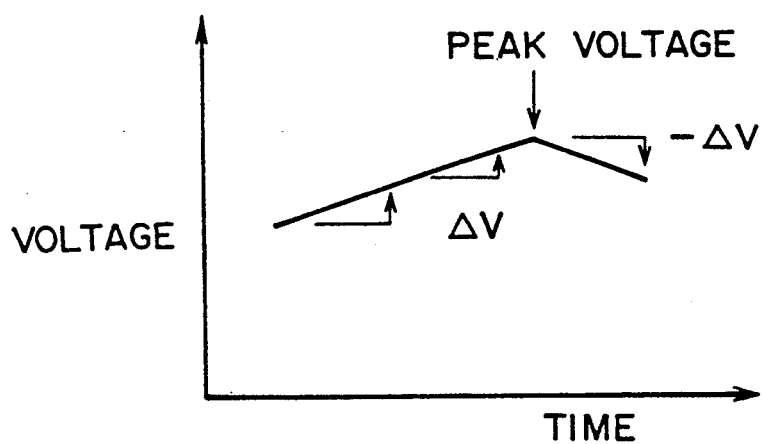
FIG. 1B is a graph showing the gradient of the charging voltage to the charging time in the method shown in FIG. 1A.
Figure 2A:
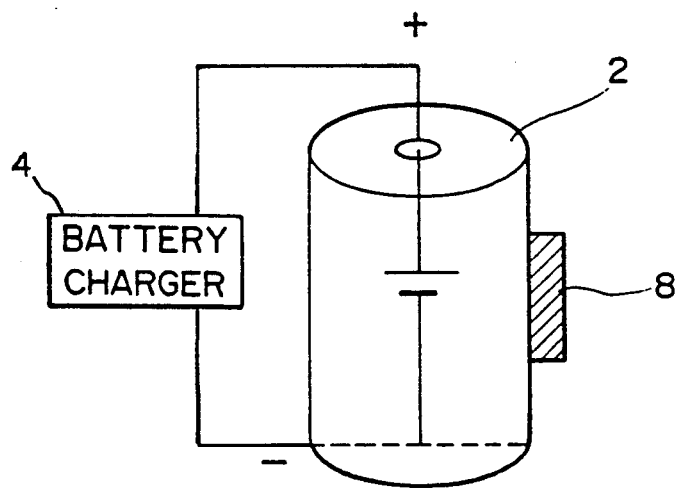
FIG. 2A is a schematic diagram showing another prior art example of a quick charging method of secondary cell.
Figure 2B:
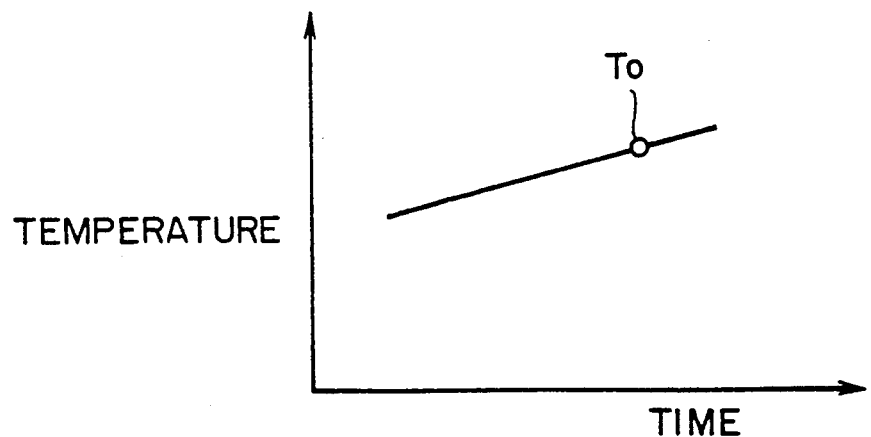
FIG. 2B is a graph showing the change of cell temperature with time in the method shown in FIG. 2A.

First, an outline of structure of a secondary cell suitable for use in the present invention will be described with reference to FIG. 3A and FIG. 3B. A secondary cell 10 includes a conductive casing 12 formed of a side plate 12a and a bottom plate 12b joined together and an insulating cover 14 and contains electrolyte in its interior. The conductive casing 12 serves as the negative terminal and the positive terminal 16 is provided in the center of the insulating cover 14. On the inner surface of the side plate 12a of the conductive casing 12, there is provided a strain gage 18 bonded to the surface. The positive terminal 20 and the negative terminal 22 of the strain gage 18 are arranged to have annular forms in the insulating cover 14. As an alternative, the negative terminal of the strain gage 18 may be connected in common with the negative terminal of the cell 10.

Figure 3A:
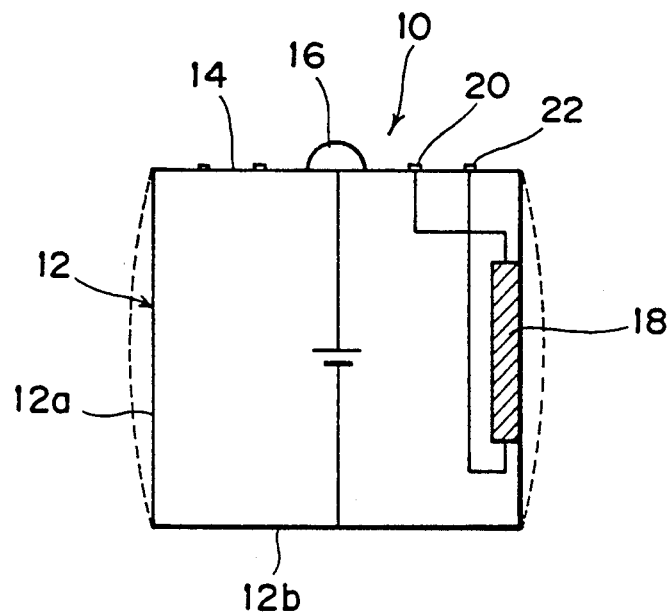
FIG. 3A is a schematic side view partly in section of a cell for use in a quick charging method of secondary cell of the present invention.
Figure 3B:
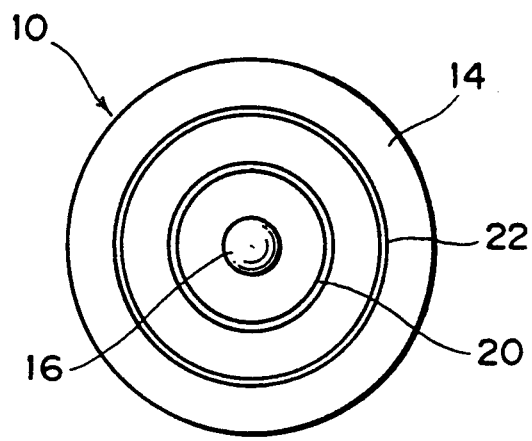
FIG. 3B is a plan view of the same.
Figure 4:
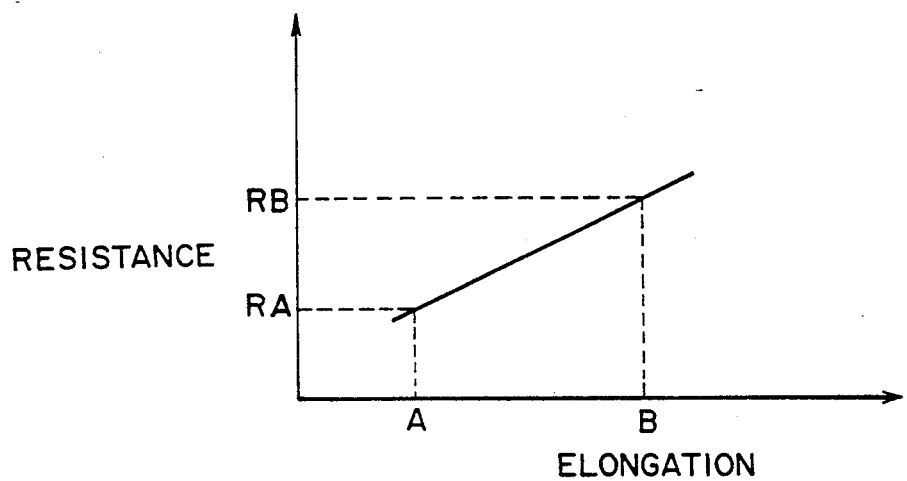
FIG. 4 is a graph showing a characteristic of a strain gage.

When the cell 10 is fully charged, the side plate 12a of the conductive casing 12 inflates as indicated by the broken line in FIG. 3A. Since the strain gage 18 is bonded to the side plate 12a of the conductive casing 12, the strain gage 18 elongates as the casing 12 inflates and, hence, the internal resistance of the strain gage 18 increases as indicated in FIG. 4. In FIG. 4, "A" indicates the elongation of the strain gage in its discharged state and B indicates the elongation of the strain gage in its fully charged state.

Figure 5:
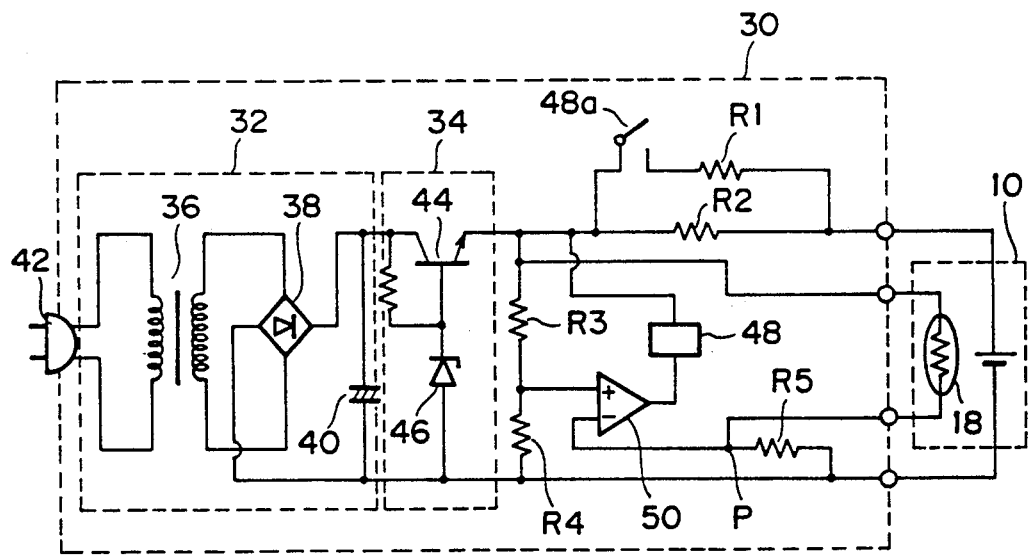
FIG. 5 is a circuit diagram of a charging circuit according to an embodiment of the present invention.

Referring now to FIG. 5, a quick charging circuit according to an embodiment of the present invention will be described. A charging circuit 30 includes a commercial-frequency current rectifier circuit 32 and a three-terminal regulator 34. The commercial-frequency current rectifier circuit 32 is made up of a transformer 36, a rectifying bridge 38, and a smoothing capacitor 40. The transformer 36 is connected with a plug 42. By inserting the plug 42 into a commercial power receptacle, the charging circuit 30 is turned ON. The three-terminal regulator 34 includes a transistor 44 and a zener diode 46 and outputs a constant voltage of +5 V.

A resistor R1 for quick charging and a resistor R2 for normal charging are connected in parallel between a cell 10 and the three-terminal regulator 34. The resistance value of the resistor R2 is set to be higher than the resistance value of the resistor R1. In series with the resistor R1, a normally open contact (make-contact) 48a of a relay 48 is connected.

Resistors R3 and R4 are voltage dividing resistors for generating a reference voltage and this reference voltage is applied to the positive-phase input terminal of a comparator 50. A resistor R5 is connected in series with the strain gage 18 and voltage at the point P is applied to the negative-phase input terminal of the comparator 50. By the output of the comparator 50, the relay 48 is ON/OFF controlled.

In operation, terminals of the cell 10 and terminals of the strain gage 18 are securely connected with terminals of the charging circuit 30 and the plug 42 of the changing circuit 30 is inserted into a receptacle of 100 V commercial power. The 100 V AC is stepped down by the transformer 36, rectified to DC current by the rectifying bridges 38, smoothed by the smoothing circuit 40, and input to the three-terminal regulator 34.

The three-terminal regulator 34 supplies a constant voltage of +5 V to the charging circuit. By having the voltage of +5 V divided by the voltage dividing resistors R3 and R4 for obtaining the reference voltage, the reference voltage is generated and applied to the positive-phase input terminal of the comparator 50. On the other hand, the voltage at the point P obtained by voltage division by the strain gage 18 and the resistor R5 is applied to the negative-phase input terminal of the comparator 50.

In the beginning stage of the charging, the resistance of the strain gage 18 is low and, hence, the voltage at the point P is higher than the reference voltage. Hence, the relay 48 is energized by the output of the comparator 50 and the contact 48a is closed. As a result, a large current flows through the cell 10 connected with the charging circuit 30 and thus quick charging of the cell 10 is performed.

When the cell 10 is fully charged, the resistance of the strain gage 18 becomes high and, hence, the voltage at the point P becomes lower than the reference voltage. Thereby, the relay 48 is deenergized and the contact 48a is opened. As a result, the charging circuit 30 comes to have only the resistor R2 of a higher resistance connected thereto and thus the charging circuit is brought into its normally charging state, i.e., it comes to charge the cell 10 with a smaller current.

According to the present embodiment, since the fully charged state of a cell is detected and, thereupon, quick charging is switched to normal charging, the cell is prevented from being damaged due to overcharging.

Although a relay having a normally open contact 48a is employed in the above described embodiment, it is also possible to employ a relay having a normally closed contact. In this case, the circuit must be modified such that the relay 48 is energized when the voltage at the point P becomes lower than the reference voltage.

What is claimed is:

1. A quick charging method of secondary cell comprising the step of:
   bonding a strain gage to the inner surface of a casing of a cell to be charged;
   connecting in parallel a first resistor for quick charging and a second resistor for normal charging to said cell;
   connecting said cell to an AC commercial power supply through a battery charger;
   charging said cell through said first and second resistors when the resistance of said strain gage is lower than a specified value; and
   charging said cell only through said second resistor when the resistance become higher than the specified value.

2. A quick charging method of secondary cell according to claim 1, wherein said last two steps comprise the steps of:
   generating a voltage for measurement according to the resistance of said strain gage;
   connecting a contact of a normally closed contact relay in series with said first resistor;
   comparing said voltage for measurement with a reference voltage; and
   energizing said relay so as to open said contact when the voltage for measurement becomes lower than said reference voltage.

3. A quick charging method of secondary cell according to claim 1, wherein said last two steps comprise the steps of:
   generating a voltage for measurement according to the resistance of said strain gage;
   connecting a contact of a normally open contact relay in series with said first resistor;
   comparing said voltage for measurement with a reference voltage;
   energizing said relay so as to close said contact when the voltage for measurement is higher than said reference voltage; and
   deenergizing said relay so that said contact is opened when the voltage for measurement becomes lower than said reference voltage.

4. A quick charging circuit of secondary cell comprising:
   a strain gage bonded to the inner surface of a casing of a cell to be charged;
   a rectifier circuit for converting alternating current to direct current;
   a first resistor for quick charging connected between said cell and said rectifier circuit;
   a second resistor for normal charging connected between said cell and said rectifier circuit and in parallel with said first resistor;
   switch means connected in series with said first resistor;
   means for generating a reference voltage;
   means for generating a voltage for measurement according to resistance of said strain gage;
   comparison means for comparing said voltage for measurement with the reference voltage; and
   means connected with said comparison means for closing said switch means when said voltage for measurement is higher than said reference voltage and opening said switch means when said voltage for measurement is lower than said reference voltage.

5. A quick charging circuit of secondary cell according to claim 4, wherein said means for closing and opening said switch means is a relay and said switch means is a contact of said relay.

6. A quick charging circuit of secondary cell according to claim 4, wherein said strain gage is connected with said rectifier circuit, and said means for generating voltage for measurement includes said strain gage and a third resistor, which is connected with said rectifier circuit in series with said strain gage.

* * * * *

UNITED STATES PATENT AND TRADEMARK OFFICE
CERTIFICATE OF CORRECTION

PATENT NO. : 5,260,638
DATED : November 9, 1993
INVENTOR(S) : Minoru Hirahara

It is certified that error appears in the above-indentified patent and that said Letters Patent is hereby corrected as shown below:

In column 4, lines 32-33, delete "changing" and insert --charging--.

In column 5, line 9, delete "step" and insert --steps--.

In column 5, line 22, delete "become" and insert --becomes--.

Signed and Sealed this

Seventeenth Day of January, 1995

Attest:

BRUCE LEHMAN

Attesting Officer     Commissioner of Patents and Trademarks